United States Patent [19]

Puchelt et al.

[11] 4,046,632
[45] Sept. 6, 1977

[54] NUCLEAR REACTOR PRESSURE VESSEL, MULTIPLE MEASURING LINE, BUSHING ASSEMBLY

[75] Inventors: Manfred Puchelt, Buckenhof; Hartmut Seidelberger, Erlangen, both of Germany

[73] Assignee: Kraftwerk Union Aktiengesellschaft, Mulheim (Ruhr), Germany

[21] Appl. No.: 566,317

[22] Filed: Apr. 9, 1975

[30] Foreign Application Priority Data

Apr. 10, 1974  Germany ............................ 2417601

[51] Int. Cl.² .............................................. G21C 17/00
[52] U.S. Cl. ............................... 176/87; 176/19 J; 176/19 EC; 285/137 R; 285/286; 248/49
[58] Field of Search ............... 176/19 R, 19 J, 19 EC, 176/87, 36; 248/49; 174/94 R; 285/137 R, 286

[56] References Cited

U.S. PATENT DOCUMENTS

| 3,240,514 | 3/1966 | Bell | 285/286 X |
|---|---|---|---|
| 3,444,374 | 5/1969 | Kinoshita et al. | 176/19 R X |
| 3,716,450 | 2/1973 | Lions | 176/19 R |
| 3,724,268 | 4/1973 | Kuwabara | 176/19 J X |
| 3,803,703 | 4/1974 | Montgomery | 285/286 X |
| 3,817,829 | 6/1974 | Frisch et al. | 176/36 R X |
| 3,834,740 | 9/1974 | Bazant et al. | 285/286 X |
| 3,847,733 | 11/1974 | Ventre | 176/87 X |
| 3,849,257 | 11/1974 | Bevilacqua | 176/36 R |
| 3,899,390 | 8/1975 | Klein et al. | 176/87 X |

*Primary Examiner*—Peter A. Nelson
*Attorney, Agent, or Firm*—Kenyon & Kenyon, Reilly, Carr & Chapin

[57] ABSTRACT

A bundle of individual measuring lines extends through the cover of a reactor pressure vessel, the bundle extending into a tubular mounting having a multiplicity of extending tubes through which the individual lines of the bundle extend. In each tube the line is passed through a sleeve slidably inserted in the tube and having an inner portion soldered to the line and an outer portion welded to the tube's outer end. The length of the sleeve and tube between the soldered and welded joints is made sufficient to prevent the heat of welding from effecting the soldered joints. Each line can be removed from its tube by cutting away the welded joint and removing the line with its sleeve from the tube. The line can be reinstalled by returning the sleeve to its tube and making a new welded joint with the sleeve spacing its soldered connection with the line far enough to prevent the welding heat from affecting the soldered joint between the sleeve and the line.

5 Claims, 3 Drawing Figures

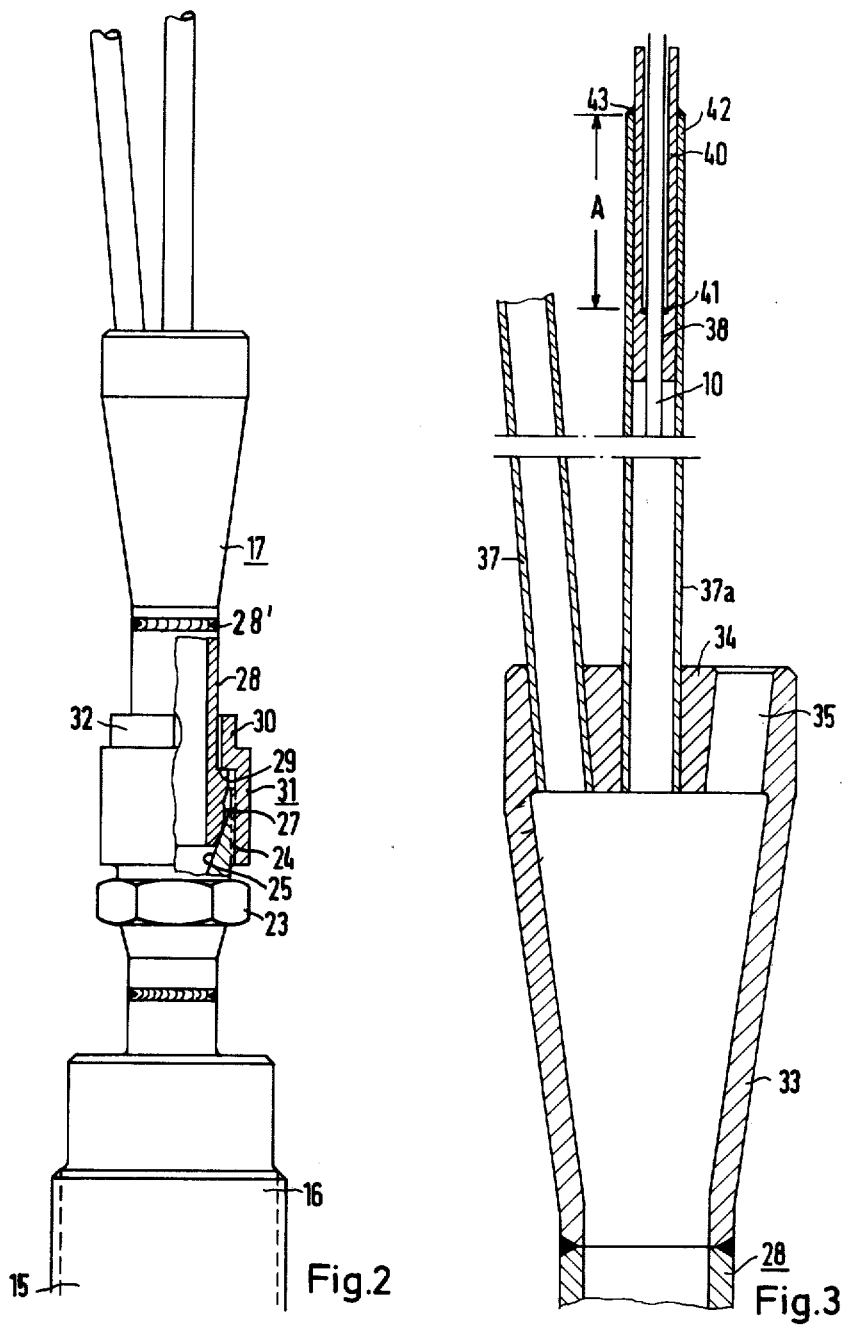

NUCLEAR REACTOR PRESSURE VESSEL, MULTIPLE MEASURING LINE, BUSHING ASSEMBLY

BACKGROUND OF THE INVENTION

A nuclear reactor, for example, a pressurized-water reactor, normally comprises a pressure vessel containing the core and having a removable cover for the purpose of permitting refueling of the reactor core within the vessel. Measuring instruments are positioned within the core and have measuring lines conducting electrical or physical or measuring values from the core and through a suitable passage in the pressure vessel, normally in its cover, and leading to instrumentation for determining the conditions existing in the core within the vessel.

These measuring lines extending from a plurality of sensor units within the core, must be bundled and passed in a pressure-tight manner through the pressure vessel and to external instrumentation. The various measuring lines can be bundled so they can be passed through a single opening in the pressure vessel, normally through the vessel's removable cover. When done in this manner, removal of the cover of the pressure vessel, such as is done for refueling of the core in the vessel, results in withdrawal of the measuring lines and their sensor units from the pressure vessel.

Complete pressure sealing between the bundle of measuring wires and the pressure vessel is, of course, essential. Furthermore, in the event one of the sensor units, or probes, must be replaced or serviced when the pressure vessel cover is removed, the individual measuring line for that sensor unit should be removable relative to the cover.

The measuring lines have relatively thin-walled cladding which is mechanically and thermally sensitive, and they are often connected undetachably with their sensing or measuring devices. Sealing of the clad measuring lines relative to the vessel, such as its cover, therefore presents substantial difficulties. If one of the measuring lines and its sensor unit only must be replaced, such individual replacement is desirable, as contrasted to replacing the entire bundle of measuring lines which pass through the reactor pressure vessel to the external instrumentation.

SUMMARY OF THE INVENTION

With the foregoing in mind, the object of the present invention is to provide a nuclear reactor pressure vessel, multiple measuring line, bushing assembly, or feedthrough, for passing a bundle of the measuring lines through the pressure vessel in a pressure-tight manner permitting individual removal of the individual lines when necessary.

To attain this object, according to the invention, a tubular mounting has an inner end provided with releasable means for releasably connecting it to the pressure vessel with the bundle of measuring lines projecting into the mounting and the mounting having an outer end from which a multiplicity of tubes extend to terminal ends with the lines extending individually from the bundle within the mounting, through individual ones of the tubes and beyond their terminal ends to the external instrumentation. Each line is passed through a sleeve slidably inserted in its individual tube and each sleeve has an inner portion within its tube and which has a soldered joint with the line which is normally externally metallic. Each sleeve has an outer portion projecting beyond its tube's terminal end and having a welded joint with this end. In each instance, the sleeve can have a soldered joint with the outside of its line and a welded joint with its tube's terminal end. This is made possible by the tube and the sleeve within it having a length between the soldered and welded joints long enough to permit welding of the welded joint without melting of the soldered joint. In this way each sleeve can be soldered to the line within it and thereafter inserted in its tube and the welded joint made thereafter without harm to the soldered joint. For removal of a line, the welded joint can be cut away and its sleeve removed from its tube. Upon return of the line with its sleeve to the tube, a new welded joint may be made without harm to the soldered joint. Both the tube and the sleeve must be long enough to prevent the transmission of the welding heat to the soldered joint to a degree destructive of the soldered joint.

The mounting can be removably connected to the pressure vessel so that the entire bundle of measuring lines can be removed.

BRIEF DESCRIPTION OF THE DRAWINGS

Having reference to the accompanying drawings:

FIG. 2 partially in elevation and partially in vertical section shows an example of the invention; and FIG. 3 on an enlarged scale relative to FIG. 2, in vertical section shows details of FIG. 2.

DETAILED DESCRIPTION OF THE INVENTION

Figure 1:
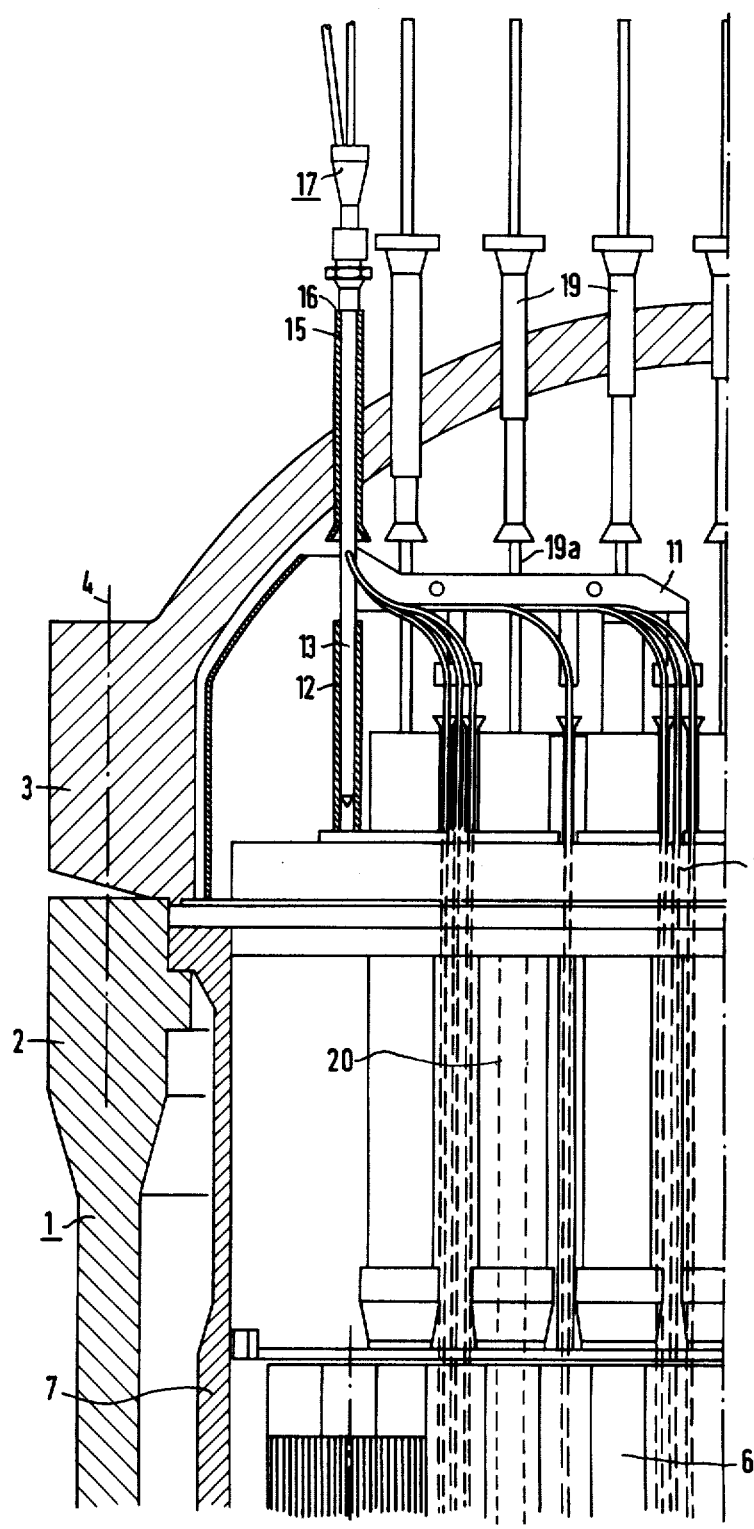
FIG. 1 shows the upper portion of a pressurized-water reactor pressure vessel with the measuring lines and illustrating an example of the present invention.

Having reference to the above drawings, in FIG. 1 the upper portion of a pressurized-water reactor pressure vessel is shown at 1, with its side wall 2 and its top cover 3 removably positioned by screws indicated at 4. The pressure vessel contains the reactor core 6 positioned within a core barrel 7. From the core 6 a multiplicity of measuring lines extend from positions distributed throughout the cross section of the core. These lines 10 can combined or bundled above the reactor core by means of a yoke 11 supported in a pin 13 removably positioned in a bushing 12. The bundled measuring lines 10 lead into a tubular stub 15 inserted in a pressure-tight manner in the removable cover 3, the stub forming a passage through the cover. At the outer end of the stub a multiple measuring line, bushing assembly 17 is positioned. Various tubular stubs, 19, distributed relative to the stub 15, are also arranged vertically through the removable cover 3 and serve to pass control rods 19a which extend through control rod guide tubes 20 of the usual fuel assemblies which form the core 6. The bundle of measuring lines may extend through several of the control rod guide tubes, as required, it being understood that the control rod guide tubes of each of the fuel rod assemblies forming the core 6, need not all be used for the control rods.

Referring now to FIGS. 2 and 3, the upper or outer end 16 of the tubular stub 15 mounts the bushing or feedthrough assembly 17 of the present invention. The free end 16 connects with the lower part 23 of a pipe union externally formed with flats for application of a holding wrench, and which is externally threaded at 24 while internally providing a female conical seat 25. The male part 28 of the union has a spherical surface 27 which fits and is pressed into the conical seat 25, the male part having an external flange 29 engaged by the union nut 30 which is screwed on the external threads 24 of the female part of the union 31. The union nut 30 has an external surface 32 shown as being cylindrical for engagement by a pipe wrench, while the portion 23 is held by an end wrench. However, the surface 32 might also be formed for engagement by an end wrench.

The male part 28, which is, of course, tubular, is welded at 28' to the inner end of a tubular mounting 33 which flares upwardly to form a flat plate or end wall 34 at right angles to the axis of the mounting 33. In this end plate 34 a multiplicity of holes 35 are formed with a central hole peripherally surrounded by eight uniformly distributed holes, this being on the assumption that nine measuring lines are involved by the bundle of measuring lines. There is one central tube 37a and eight annularly distributed tubes 37, these tubes 37 symmetrically surrounding in an annular fashion the tubes 37a and the tubes 37 diverging outwardly from the central tube 37a.

It is important that the tubes 37 and 37a each have a length several times its diameter, as exemplified by five times its diameter. Assuming the male union section 28 as having an inside diameter of 15.5 mm, the outside diameters of the tubes 37 may each be only 7 mm, but the lengths of the tubes 37 may be about 100 mm. The flaring tubes 37 may have an angularity of about 5° relative to the control tube 37a which is axially aligned with the part 33. The tubes 37 and 37a can be about eight times as long as their outside diameter.

Each of the lines 10 which individually extend through the tubes 37 and 37a is passed through a sleeve 40 slidably inserted in its one of the tubes 37-37a, each sleeve having an inner portion fitting the line 10 and which is soldered to the outside of the line as at 41, it being understood that all of the lines are necessarily externally metallic as by having suitably armor. Outwardly beyond the portion 38 the inside of the sleeve is spaced from the outside of the line, and the sleeve has an outer portion projecting beyond the terminal portion of its tube 37 and which is weld-jointed to the tube as at 43.

The length of the sleeve and tube extending between the soldered and welded joints and indicated at A in FIG. 3 is made long enough so that during application of the welded joint 43 the soldered joint 41 is not affected by the heating.

In the operation of this new arrangement, when the pressure vessel's cover 3 is removed, the various measuring lines with their sensor units are removed from the core 6. If everything is operative, everything is replaced undisturbed.

However, if one of the sensor units or its measuring line is defective, the welded connection 43 can be cut away and the measuring line 10 and its sleeve 40 then pulled out so that its sensor unit can be removed and a new line provided. With the new line being first soldered connected to the sleeve 40, it can be reinserted with the new sensor unit then applied, or the old one if still effective, and weld 43 then made. Each tube 37-37a can be initially made long enough so that if cut and rewelded to a sleeve, the distance A remains adequate to prevent the welding heat from being conducted lengthwise to the parts to the soldered joint 41.

It is to be understood that all of the parts described hereinabove are made of metal. The union 31 should be made tight enough to resist the pressure of the pressurized-water coolant within the pressure vessel, this applying also to the tubular stub 15 and all welds between it and the pipe union 31 as well as the weld 28'. The tubes 37-37a can be installed in the end plate or wall 34 in the manner of the tubes in the tube plate of a heat exchanger, and, of course, the soldered connections 41 and welded connections 43 must also resist the coolant pressure within the pressure vessel.

What is claimed is:

1. A nuclear reactor pressure vessel having a passage through which a bundle of individual measuring lines extends, a tubular mounting having an inner end provided with releasable means for releasably connecting it to said vessel with said bundle projecting into the mounting and the mounting having an outer end from which a multiplicity of tubes start and extend to terminal ends with said lines extending individually from the bundle through individual ones of the tubes and beyond their terminal ends, each line being passed through a sleeve slidably inserted in the tube through which the line extends and the sleeve having an inner portion with a terminal end within the tube and which portion has a soldered joint with the line and the sleeve having an outer portion projecting beyond the tube's terminal end, each tube having a length between the soldered and welded joints long enough to permit welding of the welded joint without melting of the soldered joint.

2. The vessel of claim 1 in which the vessel has a removable cover through which a tubular stub extends to an outer end to form said passage, and a pipe union connects the inner end of said tubular mounting to the stub's said outer end to form said releasable means.

3. The vessel of claim 2 in which said union has one part fixed to the stub's outer end and which forms a conical female seat, and a second part fixed to the mounting and which forms a spherical male element engaging said seat, a union nut holding said parts together.

4. The vessel of claim 1 in which said tubular mounting flares from its said inner end to its said outer end and the latter forms a wall extending transversely to the axis of the mounting and from which said tubes extend in the form of an annular flaring bundle of tubes so that the tubes' said outer ends are spaced apart.

5. The vessel of claim 1 in which each of said tubes has a length at least five times its diameter.

* * * * *